United States Patent
Aceto et al.

[15] 3,665,988
[45] May 30, 1972

[54] PROCESS FOR PRODUCING GRANULAR AND FIBROUS COLLAGEN DISPERSIONS

[72] Inventors: Nicholas C. Aceto, Roslyn; Joseph Naghski; Michael Komanowsky, both of Philadelphia, all of Pa.

[73] Assignee: The United States of America as represented by the Secretary of Agriculture

[22] Filed: Mar. 31, 1970

[21] Appl. No.: 24,327

[52] U.S. Cl. .................................146/227, 146/239, 99/176
[51] Int. Cl. .............................................................A23l 1/44
[58] Field of Search ......................146/237, 239, 240; 99/176

[56] References Cited

UNITED STATES PATENTS 3,151,990  10/1964  McKnight................................99/176

Primary Examiner—Willie G. Abercrombie
Attorney—R. Hoffman and W. Bier

[57] ABSTRACT

A collagen granule is prepared from unhaired hides by cutting the hide into long, thin strips, recutting the strips and comminuting the recut strips. Collagen fibers are prepared from the granule by shearing in a disc mill. Since no added water is required in the process, the solids content of the product is virtually the same as that of the original hide. The flexibility of the process conditions allow for the production of granules and fibers of different lengths so that collagen products can be made for incorporation into a variety of human and animal foodstuffs.

2 Claims, No Drawings

PROCESS FOR PRODUCING GRANULAR AND FIBROUS COLLAGEN DISPERSIONS

A non-exclusive, irrevocable, royalty-free license in the invention herein described, throughout the world for all purposes of the United States Government, with the power to grant sublicenses for such purposes, is hereby granted to the Government of the United States of America.

This invention relates to a granular form of collagen and to collagen fibers and more particularly to dispersions of the same containing from 15–40 percent solids and to a process for preparing the dispersions.

The increased production of livestock coupled with a reduction in the principal market for hides and skins makes it imperative that other uses be found for these products. To date, the use of collagen in foods has been largely neglected. However, this is potentially the largest outlet for collagen, other than its use for the manufacture of leather.

Native collagen is not digested readily and is deficient in essential amino acids. However, as a partially hydrolyzed gel it is readily digested. In this form it can serve as a binder, wrapping or coating for other foods. The manufacture of sausage casings from collagen is an encouraging start on a food use. However, this market will take only a small fraction of available hides to meet its requirements. Consequently, there is a need to find other uses for and to make other products from the over abundance supply of hides.

There is considerable current and potential demand for collagen fiber dispersions for use in sausage casings, surgical applications, paper making, food applications such as food binders and/or extendors, vegetable protein texturizers and as a component of high protein value synthetic meat. Therefore, it is essential that methods be found and products made from the current available hide supply to satisfy the needs in these other applications and to utilize the over supply of hide material.

It is an object of this invention to process the hide to a high solid content dispersion with acceptable uniformity for use in other fields especially in the food industry.

Another object of this invention is to prepare from the hide material a granular product which can be incorporated into food stuff for human and animal consumption.

Still another object is to provide a means of producing a dispersion of collagen fibers of a preselected fiber length distribution for surgical applications, food additives and binders, paper fillers and other similar uses.

According to this invention unhaired hides were cut into long, thin strips which were recut in a rotary knife cutter and then fed to a comminuting mill to obtain a product of desired size. An important feature of the process just briefly described is that the only water present during the processing is that naturally present in the hide material. If necessary, the moisture content of the hide to be processed can be adjusted to any desired level. Since all prior art methods of preparing fibrous forms of collagen from hide material call for the addition of relatively large amounts of water, the process of this invention in which no added water is required is unique.

The materials to which this process can be applied are animal hides, either grain or flesh splits or whole hides from cattle, sheep, swine, etc., which have been fleshed and unhaired, and are either fresh, or in the lime, or washed and delimed. Limed fleshed flesh-side hide splits are washed to remove lime and the pH is adjusted to a suitable level. Whole hides or grain-side splits can be used provided they are fleshed and unhaired in which case the hides or splits need not be washed nor the pH lowered before treatment. The hides or splits are fed to a strip or rag cutter to obtain strips about one-fourth to three-fourths inches wide. The strips are then put through a rotary knife cutter using screens with ½ to 1.0 inch diameter openings after which the material from the rotary cutter is fed to a comminuting mill or high-speed cutter-grinder. The comminuting mill is equipped with a means for feeding dry ice to the cutting chamber so that if it is so desired a constant cutting head temperature can be maintained. In order to avoid denaturation of the collagen it is often desirable to keep the cutting head temperature below that at which collagen denatures.

The cutting heads on the comminuting mill range in size from 0.02 to 0.50 inches so that a product, largely collagen granules, in this size range can be obtained without further processing. If fibers and small fiber bundles are the desired product, the collagen granules from the comminuting mill are further processed in a revolving disc mill which provides the shearing action necessary to separate the granules into fibers. These operations are important because granules, fiber bundles or fibers of any desired preselected length can be produced depending on how or in what product they are to be utilized.

The following is an example of the process: 125 pounds of limed fleshed flesh-side splits, washed and adjusted to pH 7, were cut in a strip cutter into strips one-fourth to three-fourths inches wide and divided into two batches. The first batch was passed through a one inch screen in a rotary knife cutter while the other batch was passed through the rotary knife cutter without a screen. When the two products from the rotary knife cutter were passed through a 0.060 inch head of a comminuting mill operating at 5,325 r.p.m., along with sufficient powdered dry ice to prevent denaturation, it was found that although the screened material passed through more easily, the two products appeared identical. The products, slurries of sharply cut, well-defined granular particles at a solids level of about 29 percent in which the pH was about 7.0, showed little or no denaturation and were easily dispersed without clumping or aggregating. A portion of the composite product was force-fed to a single revolving disc mill with the plates set at approximately a three-eighths inch clearance. The final product, about 28 percent solids, consisted of a mass of fibers containing no hard granules.

When mixed with fresh ground beef, the product of this invention, especially the collagen granules of about 0.060 inches, helped to retain weight, prevented loss of juices and reduced shrinkage during frying or baking. Collagen granules at the 0.060 inch size were not detectable when the product in which the granules were incorporated was masticated.

We claim:

1. A process for the preparation of high-solids dispersions of undenatured collagen granules and high-solids dispersions of undenatured collagen fibers, comprising:
   a. cutting unhaired hides into strips from 0.25 to 0.75 inches wide;
   b. recutting said strips in a rotary knife cutter into pieces not longer than about one inch in length;
   c. comminuting said recut strips through a cutting head having uniform diameter openings, said openings ranging in size from 0.02 to 0.50 inches, said comminuting being done at a temperature low enough to prevent denaturation of the collagen and in the presence of only that moisture present in the uncut hide material to obtain at this stage a dispersion of collagen granules containing about 15 to 40 percent solids; and
   d. shearing said dispersion of collagen granules in a revolving disc mill to obtain a dispersion of collagen fibers containing about 15 to 40 percent solids.

2. The process of claim 1 wherein the comminuting is done in the presence of dry ice.

* * * * *